March 24, 1953 E. B. HALES 2,632,865
CIRCULAR SWEEP CIRCUIT
Filed April 3, 1946
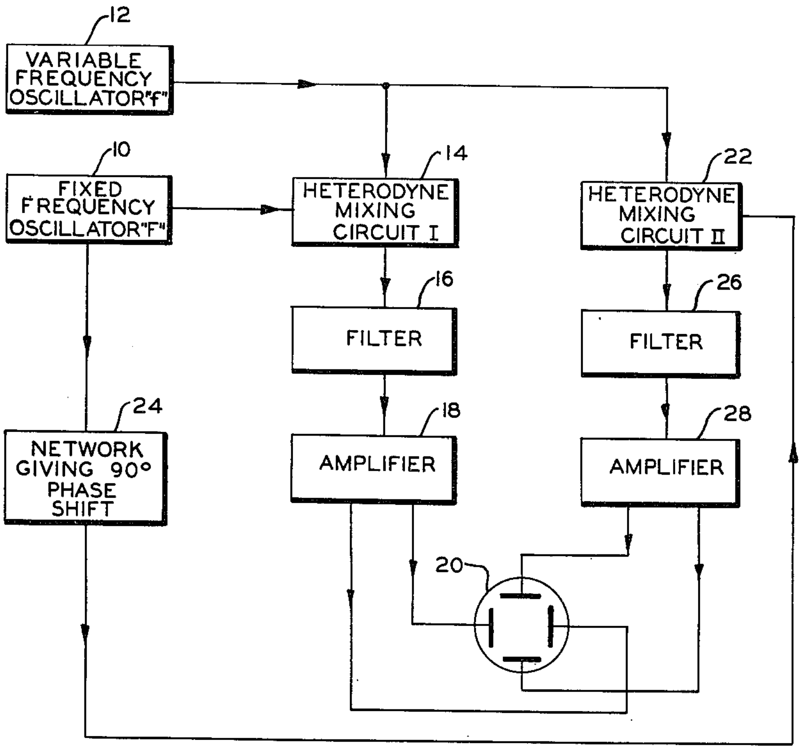
INVENTOR
EVERETT B. HALES
BY M. A. Hayes
ATTORNEY Patented Mar. 24, 1953 2,632,865

UNITED STATES PATENT OFFICE 2,632,865

CIRCULAR SWEEP CIRCUIT

Everett B. Hales, Columbia Station, Ohio, assignor, by mesne assignments, to the United States of America as represented by the Secretary of the Navy Application April 3, 1946, Serial No. 659,186

7 Claims. (Cl. 315—24)

This invention pertains to means for generating a circular trace on the face of a cathode ray oscilloscope, and more particularly to such means incorporating a control over the frequency of said circular trace.

Oscilloscopes provided with circular traces (known as "J-scopes") are known in the prior art. In general, they require two approximately equal voltages substantially in phase quadrature applied to oscilloscope plates approximately in space quadrature. These voltages are obtained by introducing a relative phase shift of 90 degrees between the two voltage components, ordinarily by use of suitable impedance networks. Such a network produces the proper phase and amplitude output at only one frequency. What is proposed here is a novel means of producing the circular trace inherent in a J-scope, means which include a convenient control over the circular sweep frequency.

It is an object of this invention to provide a system for producing a circular trace on a cathode ray oscilloscope.

It is another object of the invention to provide a system for producing a circular trace on a cathode ray oscilloscope, said system including means for controlling the frequency of said circular trace.

Other objects and advantages will be apparent from study of the accompanying claims and description taken in conjunction with the drawing, the single figure of which is a block diagram illustrating a preferred embodiment of this invention.

Referring to the figure, there is shown a fixed frequency oscillator 10 and a variable frequency oscillator 12. Within predetermined limits the frequency of oscillator 12 may be given any desired value. A first heterodyning mixer circuit 14 takes the outputs of oscillators 10 and 12 and beats them together, the resultant output going to a filter 16 and an amplifier 18. The output of amplifier 18 goes to one pair of deflecting plates of a cathode ray oscilloscope 20. In the figure, this output is shown connected to the horizontal deflecting plates. A second heterodyning mixer circuit 22 also accepts the output of variable frequency oscillator 12 and, through a conventional phase shifting network 24 such as an impedance network, that of fixed frequency oscillator 10. The output of heterodyning mixer circuit 22 goes to a filter 26 and an amplifier 28. From amplifier 28 the resultant voltage is applied to the second pair of deflecting plates of cathode ray oscilloscope 20. In the figure this is the vertical pair.

In operation, the sinusoidal output of oscillator 10 may be expressed in the form $K_1 \sin 2\pi Ft$, where $K_1$ is an amplitude constant and F is the fixed frequency of the oscillator. Similarly, the sinusoidal output of oscillator 12 may be defined in the form $K_2 \sin 2\pi ft$. $K_2$ is a constant depending on the amplitude of the voltage generated, and $f$, the frequency of oscillation, is described as variable in that it may be given any desired value within predetermined limits. Once set, however, $f$ does not change until it is given another setting. In other words, $f$ may be described as variable, but non-varying.

Heterodyning mixers 14 and 22 will produce the usual combinations of sum and difference frequencies characteristic of their type. For illustration, assume filters 16 and 26 are low pass filters, and that amplifiers 18 and 28 are tuned to the difference of the two frequencies F and $f$. If F exceeds $f$ the output of amplifier 18, in terms already established, will then by $K_3 \sin 2\pi(F-f)t$. Because of the phase shift introduced by network 24, however, the output of amplifier 28 will be a cosine function.

$$K_4 \cos 2\pi(F-f)t$$

Thus the voltage applied to the vertical deflecting plates of oscilloscope 20 is in quadrature with that applied to the horizontal deflecting plates. If filters 16 and 26 be substantially alike in phase and amplitude response, and if amplifiers 18 and 28 are similar and properly set, $K_3$ (above) will equal $K_4$ for a wide range of values of $(F-f)$ and a circular sweep will result. Thus, by adjusting $f$ only, it is possible to give to the circular sweep any desired frequency within predetermined limits.

For explanation it has been assumed that amplifiers 18 and 30 are tuned to the difference frequency $(F-f)$, and that filters 16 and 26 are low-pass. It should be emphasized that said amplifiers may be tuned to a sum frequency or to another difference frequency, without departing from the principles involved herein. In such case, filters 16 and 26 would be band-pass rather than low-pass.

What is claimed is:

1. A system for producing on a cathode ray oscilloscope a circular trace susceptible to frequency control, said system comprising in combination with said oscilloscope an oscillator having fixed frequency, a variable-frequency oscillator, a first heterodyning mixer circuit operatively connected to said fixed-frequency oscillator and said variable-frequency oscillator, a second heterodyning mixer circuit connected to said variable-frequency oscillator, phase shifting means operatively connecting said fixed-frequency oscillator and said second heterodyning mixer circuit, a filter circuit and amplifier for conducting a selected frequency of the output of said first mixer to one pair of deflection plates of said oscilloscope and a similar filter circuit and amplifier conducting the same selected frequency of the output of said second mixer to the other pair of deflection plates of said oscilloscope.

2. A system for producing on a cathode ray oscilloscope a circular trace susceptible to frequency control, said system comprising in combination with said oscilloscope an oscillator having fixed frequency, a variable-frequency oscillator, a first heterodyning mixer circuit operatively connected to said fixed-frequency oscillator and said variable-frequency oscillator, a second heterodyning mixer circuit connected to said variable-frequency oscillator, an impedance network operatively connecting said fixed-frequency oscillator and said second heterodyning mixer circuit, a filter circuit and amplifier for conducting a selected frequency of the output of said first mixer to one pair of deflection plates of said oscilloscope and a similar filter circuit and amplifier conducting the same selected frequency of the output of said second mixer to the other pair of deflection plates of said oscilloscope.

3. A system for producing a circular sweep on an oscilloscope comprising, a generator of voltages of a fixed frequency, a generator of voltages of a variable frequency, means for directly mixing the outputs of said fixed frequency voltage generator and said variable frequency voltage generator, means for shifting the phase of a portion of the output of said fixed frequency generator, means for mixing a portion of the output of said variable frequency generator with said phase shifted output of said fixed frequency generator and means for selecting signals of like frequency from the outputs of said mixing means and means for applying said signals to said oscilloscope.

4. A system for providing voltages for application to the deflection plates of an oscilloscope to produce a circular sweep thereon comprising, a generator of voltages of a fixed frequency, a generator of voltages of a variable frequency, means for directly mixing the outputs of said generator of voltages of a fixed frequency and said generator of voltages of a variable frequency, means for shifting the phase of a portion of the output of said fixed frequency generator, means for mixing a portion of the output of said variable frequency generator and said phase shifted output of said fixed frequency generator, means for extracting voltages of like frequency from said mixers and means for applying said voltages to said deflection plates of said oscilloscope.

5. A system for providing voltages for application to the deflection plates of an oscilloscope for producing a circular sweep thereon comprising, a fixed frequency oscillator, a variable frequency oscillator, means for directly mixing the outputs of said fixed and said variable frequency oscillators, means for shifting the phase of a portion of the output of said fixed frequency oscillator, means for mixing a portion of the output of said variable frequency oscillator with the phase shifted output of said fixed frequency oscillator, means for separately filtering the outputs of said mixing means and obtaining difference frequency components therefrom, and means for applying the separate difference frequency components to separate pairs of said deflection plates of said oscilloscope.

6. A sweep circuit for producing a circular sweep of variable angular frequency of the cathode ray of a cathode ray tube comprising, in combination, a fixed frequency oscillator, a variable frequency oscillator, a first mixing circuit for combining signals from said fixed and variable frequency oscillators to produce signals having frequencies equal to the sum and difference of the frequencies of said fixed and variable frequency oscillators, a second mixing circuit, a 90° phase shifting network, means for applying signals from said variable frequency oscillator to said second mixing circuit, means for applying signals from said fixed frequency oscillator through said phase shifting circuit to said second mixing circuit, whereby said second mixing circuit also produces signals having frequencies equal to the sum and difference of the frequencies of said fixed and variable frequency oscillators, first and second filtering means connected to said first and second mixing circuits, respectively, for selecting one of the aforesaid signals produced by its corresponding mixing circuit, said filters being arranged to pass frequencies in the same band, means for applying the signal selected by said first filtering means to one pair of deflection plates of the cathode ray tube, means for applying the signal selected by said second filtering means to the other pair of deflection plates of the cathode ray tube, whereby a circular trace of angular frequency directly proportional to the frequency of said variable frequency oscillator is produced on said cathode ray tube.

7. A sweep circuit for producing a circular sweep of variable angular frequency of the electron beam of a cathode ray tube comprising, in combination, a fixed frequency oscillator, a variable frequency oscillator, means for directly mixing portions of the outputs of said fixed and variable frequency oscillators to produce a first pair of signals having frequencies equal to the sum and difference of the frequencies of said fixed and variable frequency oscillators, respectively, means coupled to said fixed frequency oscillator for shifting by 90° the phase of another portion of the output of said fixed frequency oscillator, means for mixing another portion of the output of said variable frequency oscillator with the phase-shifted portion of the output of said fixed frequency oscillator to produce a second pair of signals having frequencies equal to the sum and difference of the frequencies of said fixed and variable frequency oscillators, means for separately filtering the outputs of said mixing means to derive a corresponding one of said pairs of signals from each of said mixing means, and means for applying one of said derived signals to one pair of deflection plates of said cathode ray tube and means for applying the other of said derived signals to the other pair of deflection plates of said cathode ray tube, whereby a circular trace of angular frequency directly proportional to the frequency of said variable frequency oscillator is produced on said cathode ray tube.

EVERETT B. HALES.

REFERENCES CITED

The following references are of record in the file of this patent:

UNITED STATES PATENTS

| Number | Name | Date |
|---|---|---|
| 2,135,171 | Chireix | Nov. 1, 1938 |
| 2,295,615 | Tucker | Sept. 15, 1942 |
| 2,313,966 | Poch | Mar. 16, 1943 |
| 2,408,415 | Donaldson | Oct. 1, 1946 |
| 2,423,103 | Koechlin | July 1, 1947 |
| 2,426,721 | Adams | Sept. 2, 1947 |
| 2,457,580 | Mayer | Dec. 28, 1948 |
| 2,489,296 | Koechlin | Nov. 29, 1949 |
| 2,513,293 | De Rosa et al. | July 4, 1950 |